E. KLUGE.
APPARATUS FOR UNOILING STEAM AND THE LIKE.
APPLICATION FILED OCT. 10, 1913.
1,109,588.
Patented Sept. 1, 1914.
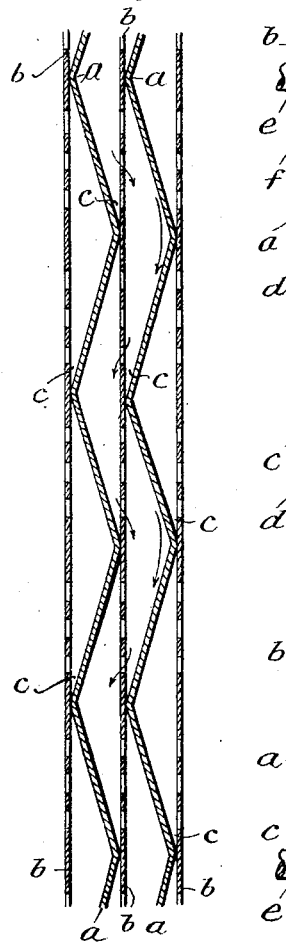
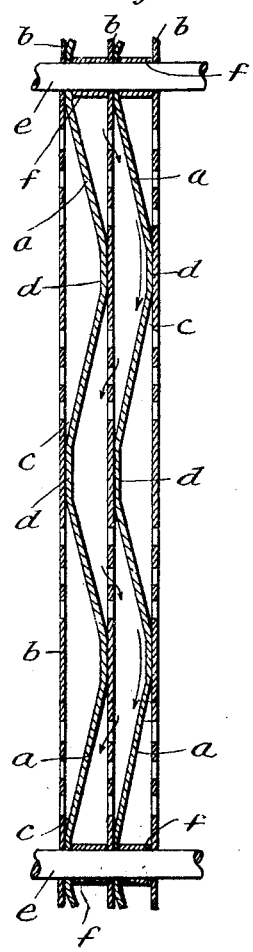
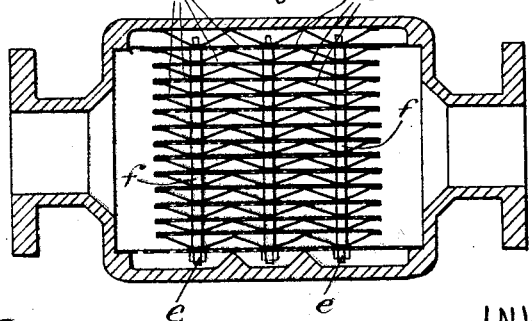
WITNESSES
INVENTOR

UNITED STATES PATENT OFFICE.

EDUARD KLUGE, OF LEIPZIG, GERMANY.

APPARATUS FOR UNOILING STEAM AND THE LIKE.

1,109,588. Specification of Letters Patent. Patented Sept. 1, 1914.

Application filed October 10, 1913. Serial No. 794,462.

*To all whom it may concern:*

Be it known that I, EDUARD KLUGE, a subject of the King of Prussia, and resident of Leipzig, Germany, have invented certain new and useful Improvements in Apparatus for Unoiling Steam and the like, of which the following is a specification.

This invention relates to an improved apparatus for separating oil from steam, of the kind having corrugated or zigzag-shaped walls with a straight strainer between each two walls.

The object of the invention is to so arrange said strainer that it is in direct contact with both its adjacent walls, while the latter are zigzag-shaped or corrugated at rather obtuse angles, so that at the contact points between the strainer and walls a plurality of small chambers with closed sharp-angled ends are produced on both sides of the strainer, in which the oil settles without being again driven along by the steam current, owing to said chambers lying practically beyond the latter.

At their contact points with the strainers, the walls may form short flattenings, parallel with the walls, so as to allow an easy mounting of bolts with spacing members thereon for keeping the arrangement in place.

The accompanying drawing shows the improved apparatus in diagrammatical sections.

Figure 1 is part of one form of the same, in which the contact points between the strainers and walls form sharp corners, while Fig. 2 is part of another form, in which the walls are flattened, parallel to the strainers, at their contact points with the latter; Fig. 3 shows the whole apparatus.

$a$ are the zigzag-shaped walls of rather obtuse angles, $b$ the straight strainers between each two walls in direct contact with the latter, $c$ the chambers with closed sharp-angled ends on both sides of the strainers, $d$ the short flattenings at the contact points between walls and strainers, through which bolts $e$ with spacing members $f$ thereon may be passed for holding the arrangement in place. Steam flows through the apparatus in the direction of the arrows shown in Figs. 1 and 2.

What I claim, is:—

1. In an apparatus for separating oil from steam, the combination of parallel zigzag-shaped walls of rather obtuse angles, a straight strainer between each two adjacent walls in direct contact with the latter, and a plurality of small chambers with closed sharp-angled ends formed at the contact points between the walls and strainers on both sides of the latter, substantially as and for the purpose set forth.

2. In an apparatus for separating oil from steam, the combination of parallel zigzag-shaped walls of rather obtuse angles, a straight strainer between each two adjacent walls in direct contact with the latter, a plurality of small chambers with closed sharp-angled ends formed at the contact points between the walls and strainers on both sides of the latter, and short flattenings at said contact points formed on said walls parallel to said strainers, substantially as and for the purpose set forth.

EDUARD KLUGE.

Witnesses:
RICHARD CLEM,
RUDOLPH FRICKE.

Copies of this patent may be obtained for five cents each, by addressing the "Commissioner of Patents, Washington, D. C."